United States Patent
Daugherty

[19]

[11] Patent Number: 6,152,844
[45] Date of Patent: Nov. 28, 2000

[54] VARIABLE DIAMETER PULLEY FOR A TRANSMISSION

[76] Inventor: B. Eugene Daugherty, 308 E. Taylor, Kokomo, Ind. 46901

[21] Appl. No.: 09/307,981

[22] Filed: May 10, 1999

[51] Int. Cl.[7] .............................. F16H 9/02; F16H 59/00; F16H 9/10
[52] U.S. Cl. .................................. 474/49; 474/50; 474/56
[58] Field of Search .................................. 474/47, 49, 50, 474/51, 53, 56, 57

[56] References Cited

U.S. PATENT DOCUMENTS

| | | |
|---|---|---|
| 534,448 | 2/1895 | McIntyre . |
| 562,234 | 6/1896 | McIntyre . |
| 1,601,672 | 9/1926 | Abbott . |
| 1,664,349 | 3/1928 | Burrow . |
| 1,993,547 | 3/1935 | Heyer ............................................ 64/8 |
| 2,233,822 | 3/1941 | Schubbe ............................. 74/230.17 |
| 2,297,936 | 10/1942 | Ballman .............................. 74/230.17 |
| 2,735,308 | 2/1956 | Peterson ............................. 74/230.17 |
| 2,769,345 | 11/1956 | Bugenhagen ....................... 74/230.17 |
| 2,774,254 | 11/1956 | Gerber ..................................... 74/675 |
| 3,066,545 | 12/1962 | Gaylond ............................. 74/230.17 |
| 3,146,628 | 9/1964 | Diehl et al. ......................... 74/230.17 |
| 3,177,733 | 4/1965 | Yamano .............................. 74/230.7 |
| 3,234,806 | 2/1966 | Maurer et al. ...................... 74/230.17 |
| 3,293,929 | 12/1966 | Booth .................................. 74/230.17 |
| 3,362,240 | 1/1968 | Beck .................................... 74/230.17 |
| 3,757,594 | 9/1973 | Kumm ................................. 74/230.17 |
| 3,924,480 | 12/1975 | Carapellucci ....................... 74/230.17 |
| 4,395,248 | 7/1983 | Keru ......................................... 474/24 |
| 4,601,681 | 7/1986 | Costelli et al. ........................... 474/28 |
| 4,650,442 | 3/1987 | Parsons ..................................... 474/29 |
| 4,735,598 | 4/1988 | Moroto et al. ............................ 474/29 |
| 4,781,656 | 11/1988 | Brackett et al. .......................... 474/29 |
| 4,875,894 | 10/1989 | Clark ........................................ 474/49 |
| 5,184,981 | 2/1993 | Wittke ...................................... 474/19 |
| 5,290,206 | 3/1994 | Graham .................................... 474/49 |
| 5,582,555 | 12/1996 | Miller ....................................... 474/49 |
| 5,601,509 | 2/1997 | Munoz ...................................... 476/53 |
| 5,688,199 | 11/1997 | Spirig ....................................... 474/49 |
| 5,800,298 | 9/1998 | Kanehara et al. .......................... 474/8 |
| 5,830,093 | 11/1998 | Yanay ....................................... 474/49 |
| 5,853,347 | 12/1998 | Aoki et al. ................................ 477/45 |

OTHER PUBLICATIONS

*CVT Problems*, Popular Science, May 1985, p. 65.
*Japanese–Style Continuously Variable Transmission*, Walter Miller.
*Impossible Squirm Drive, first real advance gears in a century*, Lindsley, Popular Science, Nov. 1984, pp. 76–78.
*CVT, the no–shift transmission*, David Scott, Popular Science, June 1980, pp. 88–89.
*At last; mass production Stepless Transmission*, David Scott, Popular Science, Mar. 1984, pp. 48 and 50.
*Get Ready for a New Kind of Automatic Transmission*, Michael Lamm, Popular Mechanics, Jun. 1984, pp. 70, 71, 105, 106, 180.
*Mechanical Movements*, W.M. Clark, 1933.

Primary Examiner—David A. Bucci
Assistant Examiner—Matthew A. Kaness
Attorney, Agent, or Firm—Woodard, Emhardt, Naughton, Moriarty & McNett

[57] ABSTRACT

A rotary power source and a continuously variable transmission are coupled together. The continuously variable transmission includes a first shaft, a first pulley coupled to rotate with the first shaft, a second shaft, a second pulley coupled to rotate with the second shaft, and an endless power transfer loop coupled about the first pulley and second pulley. The first pulley is of a variable diameter type to adjust turning ratio relative to the second pulley. This first pulley includes a pulley cage including a number of bars radially spaced apart from one another about the first shaft that are each inclined relative to a rotational axis of the first shaft and define a generally frustoconical shape. The first pulley also includes a disk defining a number of slots each receiving a corresponding one of the bars therethrough. A number of carriers are coupled to the disk to travel along a corresponding one of the slots and a corresponding one of the bars. These carriers hold a band defining a surface in contact with the endless power transfer loop. The band travels with the carriers to correspondingly change an effective diameter of the pulley when the relative position of the pulley cage to the disk is changed.

20 Claims, 8 Drawing Sheets

VARIABLE DIAMETER PULLEY FOR A TRANSMISSION

BACKGROUND OF THE INVENTION

The present invention relates to the transmission of rotary power, and more particularly, but not exclusively, an adjustable diameter pulley for a continuously variable power transmission system.

It has long been recognized that a continuously variable transmission has the potential to improve a number of different systems utilizing a rotary power source, such as an engine or motor. Compared to common transmissions that have a discrete number of "steps" or gear ratios, the "stepless" performance of an ideal continuously variable transmission is expected to significantly improve efficiency in many applications.

Unfortunately, several limitations have been encountered in trying to widely apply this type of technology. U.S. Pat. Nos. 5,830,093 to Yamay; 5,800,298 to Kanehara, et al.; U.S. Pat. Nos. 4,875,894 to Clark; and 4,781,656 Brackett, et al. are but a few examples of alternative continuously variable transmission designs that attempt to overcome various limitations. However, further advancements in continuously variable transmission technology are needed.

Thus, a demand persists for the development of continuously variable transmissions and related components. The present invention addresses this demand and provides other contributions.

SUMMARY OF THE INVENTIONS

One form of the present invention is a unique continuously variable transmission for a rotary power source. In another form, a unique variable diameter pulley is provided that may be used in continuously variable transmissions and other applications.

A further form of the present invention includes a variable diameter pulley that has two members coupled to a shaft to rotate therewith. These members are arranged so that position of one relative to the other may be adjusted to change effective diameter of the pulley as defined by at least a portion of a spiral-coiled spring.

In still another form of the present invention, a pulley includes a first rotary member and a second rotary member that are coupled to rotate with a shaft and are operable to adjust position of one relative to the other to change effective diameter of the pulley. For this form, one of the members includes a number of carriers arranged to hold an adjustable band. This adjustable band rides on the carriers and defines the pulley's diameter.

Accordingly, it is one object of the present invention to provide a unique variable diameter pulley.

It is another object of the present invention to provide a unique continuously variable transmission.

Further objects, forms, embodiments, aspects, advantages, features, and benefits of the present invention will become apparent from the detailed description and drawings provided herein.

DESCRIPTION OF THE PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
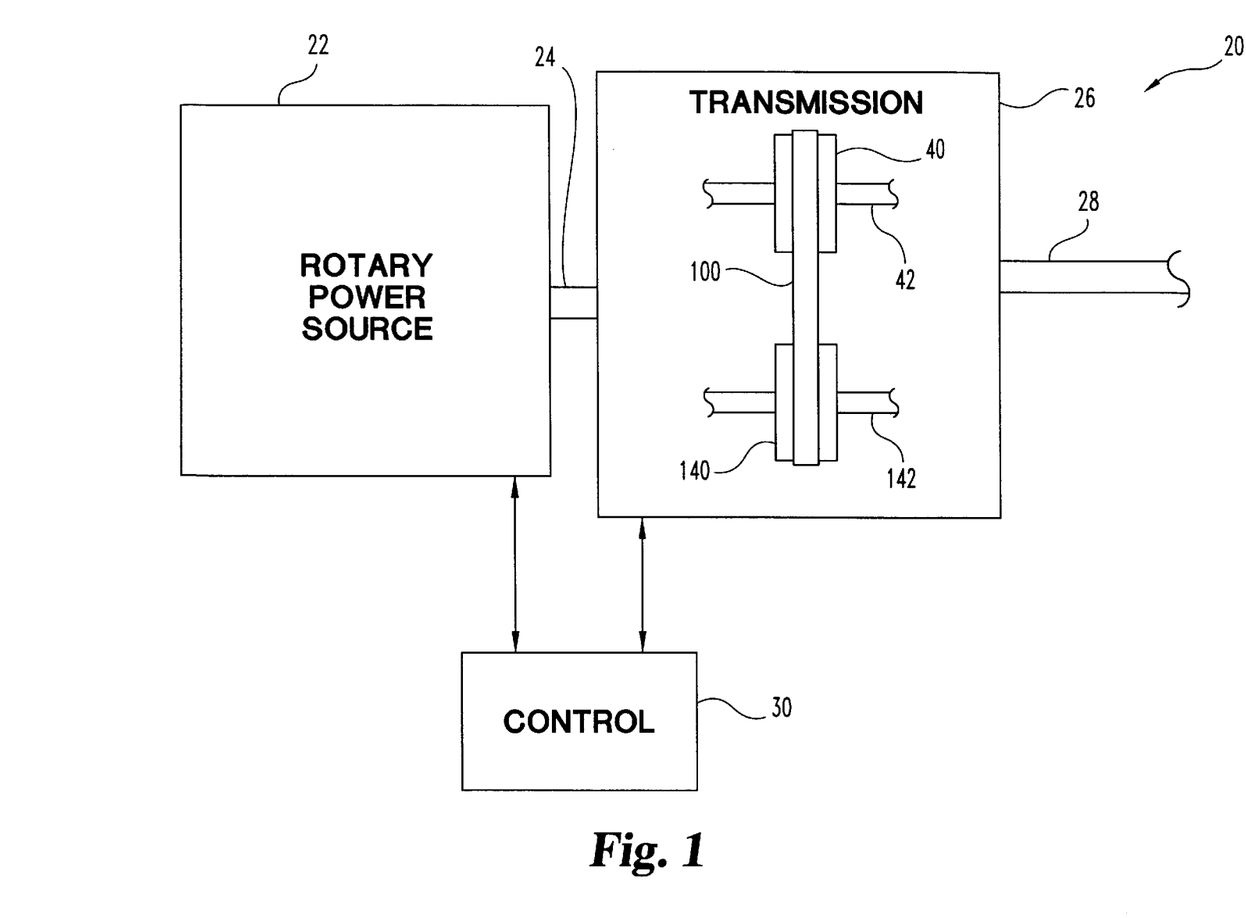
FIG. 1 is a diagrammatic view of a rotary power system according to one embodiment of the present invention.

FIG. 1 is a schematic view of rotary power system 20 of one embodiment of the present invention. System 20 includes rotary power source 22. Rotary power source 22 may be an engine or motor of a conventional type. For example, rotary power source 22 may include an internal combustion engine, such as the reciprocating piston, "wankel" rotor, or gas turbine engine variety; an electric or hydraulic motor; a steam, water, or air driven turbine; a combination of two or more of these types of rotary power sources; or such other arrangements as would occur to those skilled in the art to provide rotary power.

Rotary power source 22 is arranged to turn power shaft 24. Power shaft 24 is rotatably coupled to continuously variable transmission 26 to provide rotary power from source 22. System 20 also includes power shaft 28 rotatably coupled to transmission 26 to output rotary power for use by one or more other devices or subsystems (not shown).

Transmission 26 transmits rotary power to power shaft 28 that is input by power shaft 24, and facilitates selective control over the rate of rotation of power shaft 28 relative to power shaft 24. The particular ratio of rotational rate of power shaft 28 relative to power shaft 24 (or vice versa), alternatively designated a "turning ratio," may be regulated by adjusting variable diameter pulley 40 of transmission 26 as further described hereinafter. Rotary power source 22 and transmission 26 are operably coupled to control 30 to regulate operation thereof, as needs require.

Figure 2:
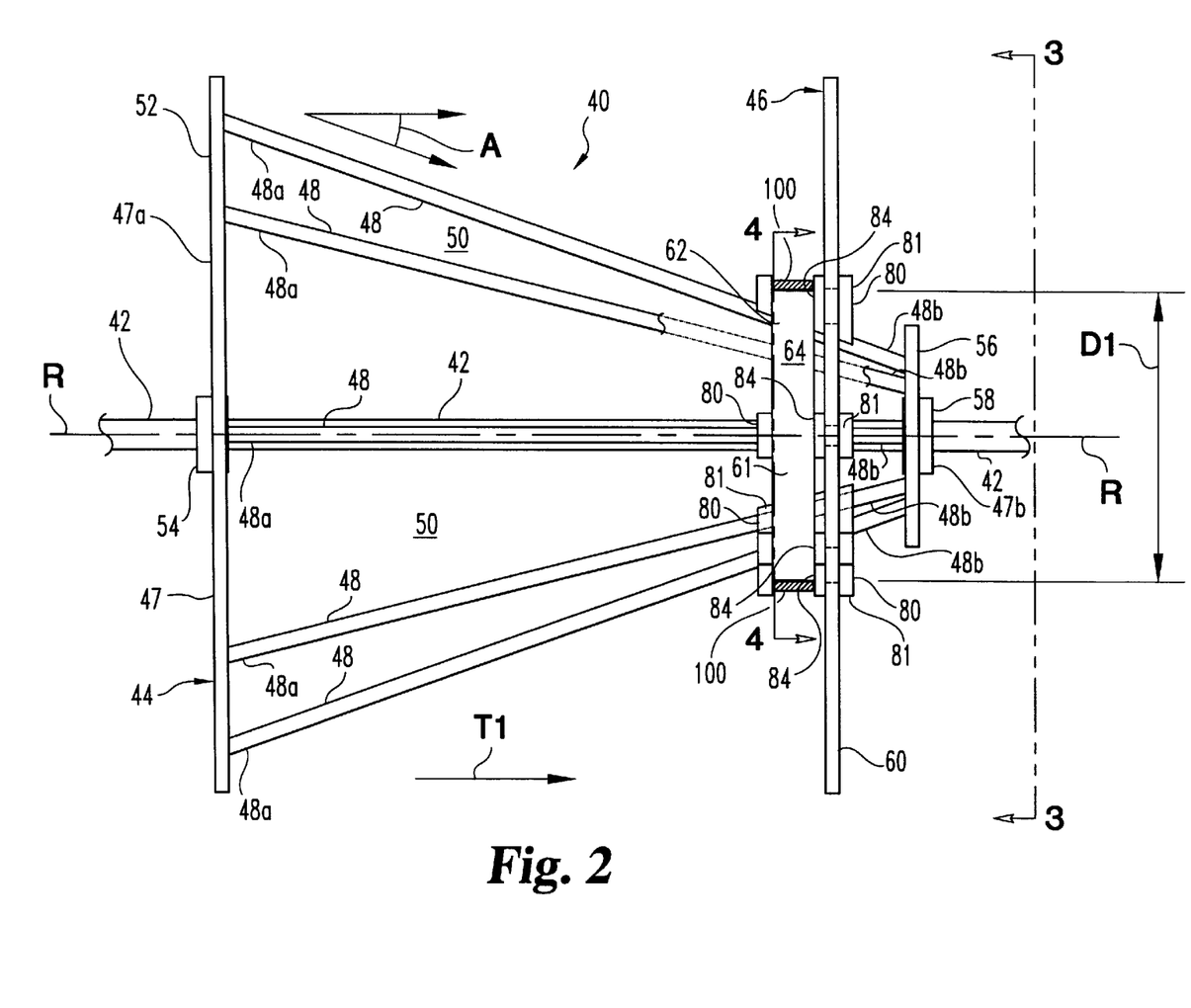
FIG. 2 is a side, elevational view of a pulley of the system of FIG. 1 configured to provide a first pulley diameter.

Variable diameter pulley 40, shown schematically in FIG. 2, is coupled to rotate with shaft 42. Transmission 26 also includes pulley 140 rotatably coupled to shaft 142. Rotation of one of pulleys 40, 140 causes rotation of the other of pulleys 40, 140 by virtue of an endless power transfer loop 100 that encircles and engages both pulleys 40, 140. Loop 100 and pulley 140 are also schematically depicted in FIG. 2. Loop 100 is shown in the form of a single belt; however, loop 100 may alternatively be in the form of a multi-link chain, multiple belts or cords, a toothed or ribbed belt, a metal block belt of the type described in U.S. Pat. No. 5,806,298 to Kanehara et al., or other such configurations as would occur to those skilled in the art. The diameter of pulley 40 in contact with loop 100 may be varied over a predetermined range relative to the diameter of pulley 140 in contact with loop 100. Correspondingly, the turning ratio between shafts 42, 142 may be varied. Further details concerning pulley 40 are provided in connection with FIGS. 2–9 hereinafter.

Pulley 140 may be of a variable diameter type, or may have a fixed diameter as performance requirements for transmission 26 dictate. In one preferred embodiment, pulley 140 is configured substantially identically the same as pulley 40. For this embodiment, pulleys 40 and 140 are oriented opposite each other to maximize the available turning ratio range. Also, it should be appreciated that power shafts 28, 24 may be operably coupled to shafts 42, 142 in such a manner that the turning ratio of power shaft 28 relative to power shaft 24 may be adjusted based on the turning ratio variability provided by pulleys 40, 140 and loop 100. In one embodiment of transmission 26, shaft 42 is arranged within transmission 26 to rotate in response to rotation of power shaft 24. As shaft 42 turns, so does pulley 40, which causes endless loop 100 and pulley 140 to rotate. With rotation of pulley 140, shaft 142 turns. For this embodiment, power shaft 28 rotates in response to shaft 142 rotation. In another embodiment, shaft 142 is driven by power shaft 24 and shaft 42 drives power shaft 28. In still other embodiments, power shafts 24, 28 may be differently arranged with respect to pulleys 40, 140, shafts 42, 142, and loop 100 as would occur to those skilled in the art.

Transmission 26 preferably includes a clutch or other device (not shown) to selectively disengage power shaft 24. Also, transmission 26 may include a number of other components of a standard type that are coupled to power shaft 24, power shaft 28, shaft 42, shaft 142, or two or more of these features as would occur to those skilled in the art. In one alternative embodiment, the pulley 40, 140 and loop 100 configuration is used two or more times within transmission 26.

Control 30 provides an actuating mechanical movement to adjust diameter of pulley 40 using standard techniques. Control 30 may include a solid-state, programmable electronic processor coupled to a hydraulic, pneumatic, or electromagnetic actuation subsystem that is, in turn, mechanically coupled to pulley 40 to adjust the turning ratio between shafts 42, 142. In such an embodiment, the electronic processor may be programmed to select the turning ratio to maximize operating efficiency of rotary power source 22. In other embodiments, control 30 may be solely mechanical in nature, having no processor, and being provided by a simple mechanism linked to pulley 40. Control 30 may also include one or more operator inputs that influence the operation of transmission 26, rotary power source 22, or both. Alternatively, control 30 may be arranged to provide for fully automatic adjustment of transmission 26 and/or rotary power source 22. In still other embodiments, control 30 may only be coupled to transmission 26 to provide for pulley 40 diameter adjustment.

In one preferred embodiment, system 20 is provided as the source of motive power for a vehicle. Such vehicles could include automobiles, snowmobiles, golf carts, all terrain vehicles, electrically powered carts, and water craft just to name a few. In other embodiments, system 20 may be utilized to provide motive power to industrial manufacturing equipment, amusement park rides, electrical power generation devices, pumps, wells, or in such other applications as would occur to those skilled in the art.

Figure 3:
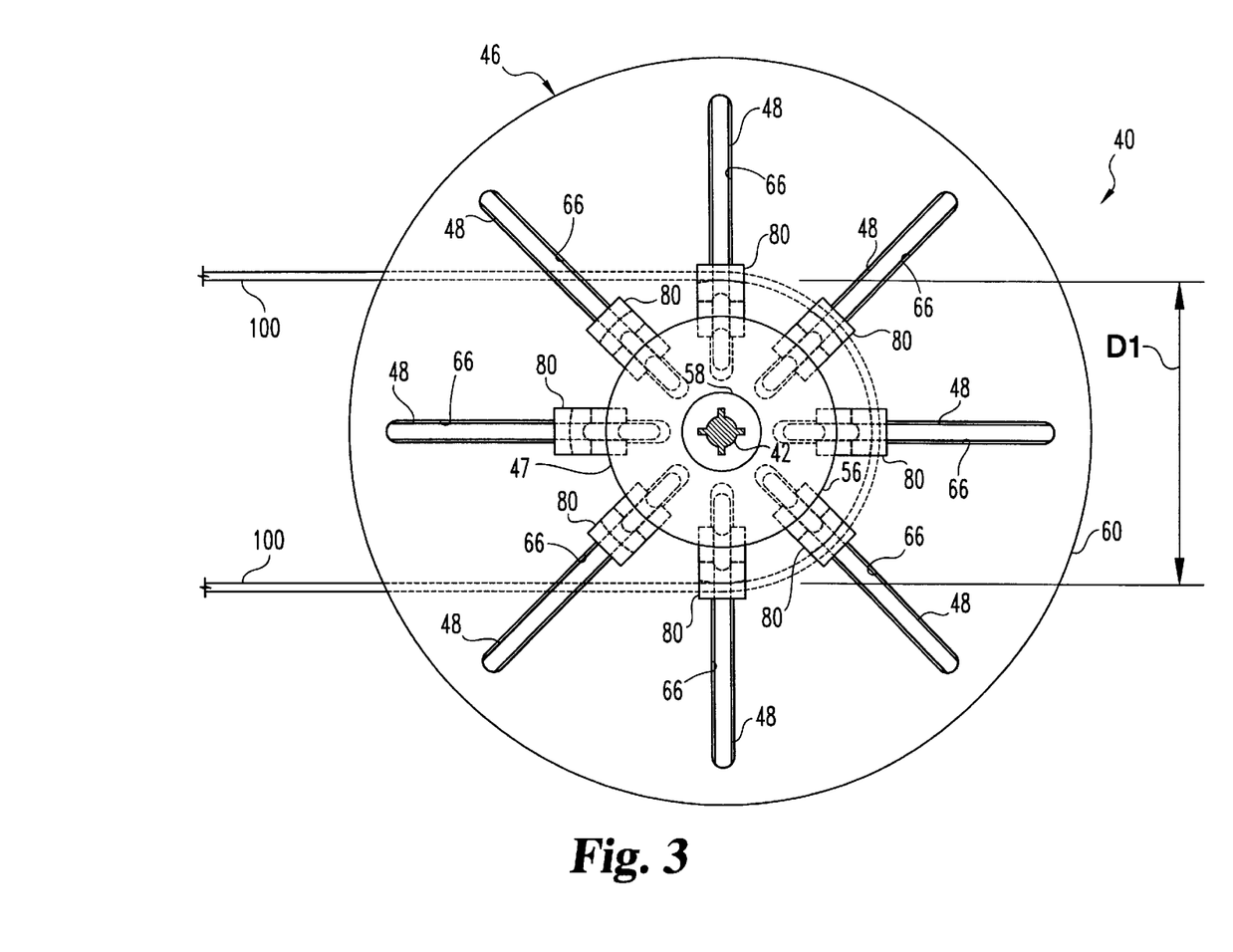
FIG. 3 is an end view of the pulley corresponding to view line 3—3 of FIG. 2.
Figure 4:
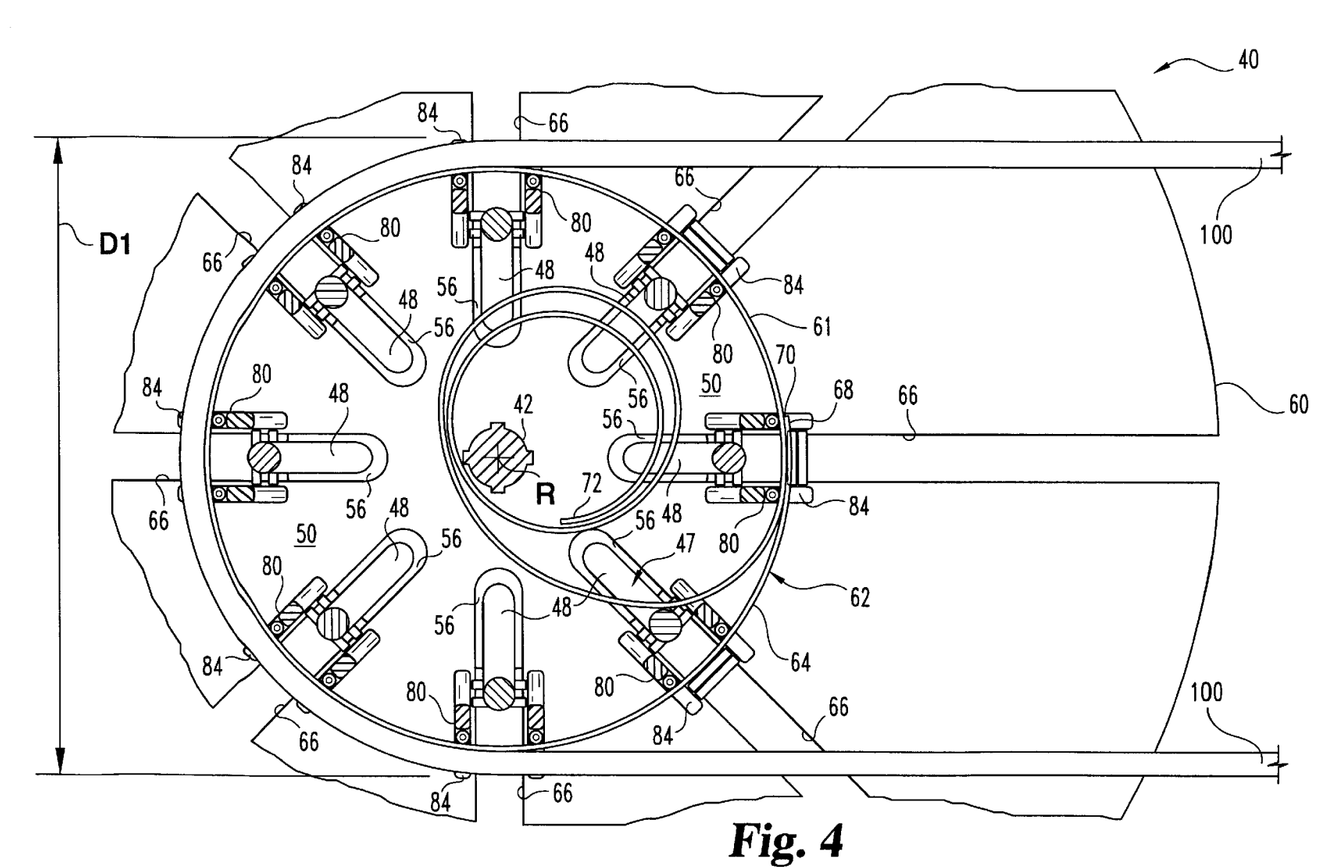
FIG. 4 is a partial, sectional view of the pulley taken along section line 4—4 of FIG. 2.

FIGS. 2–4 depict further details of one preferred embodiment of pulley 40. Pulley 40 includes rotary member 44 coupled to shaft 42, and rotary member 46 coupled to shaft 42. Members 44, 46 rotate together with shaft 42 about rotational axis R. Rotary member 44 is configured in the form of pulley cage 47 having end 47a opposite end 47b. Pulley cage 47 includes a number of inclined bars 48. Pulley cage 47 also includes hub 52 coupled to shaft 42 by bearing member 54 at end 47a, and hub 56 coupled to shaft 42 by bearing member 58 at end 47b. Bars 48 of cage 47 each become progressively closer to shaft 42 relative to a direction of travel from hub 52 to hub 56 along axis R. This direction of travel is illustrate by arrow T1. Bars 48 each have end portion 48a opposite end portion 48b. End portion 48a of each bar 48 is fixed to hub 52 and end portion 48b of each bar 48 is fixed to hub 56.

Hubs 52, 56 are each preferably in the form of a generally circular wheel that each have a center approximately coincident with axis R. Bars 48 are fixed to hubs 52, 56 in such a manner to be radially spaced about shaft 42 at generally uniform angular intervals. For the illustrated embodiment, there are eight bars 48 depicted at approximately 45 degree intervals relative to the rotational center defined by axis R. Bars 48 each have a generally circular cross-section taken along axis R. Correspondingly, for the side view depicted in FIG. 2, only five bars 48 are visible, with the other three bars 48 being obscured. In FIG. 2, one of the five visible bars 48 is shown with a cutaway portion to prevent obscuring other aspects of the invention illustrated thereby, as will be more fully described hereinafter.

Accordingly, in cooperation with hubs 52 and 56, bars 48 define a generally frustoconical shape for pulley cage 47. Pulley cage 47 defines internal chamber 50 between bars 48 and shaft 42. Angle A represents the degree of inclination of each bar 48 relative to axis R. Preferably, angle A is in a range of about 5 degrees to about 80 degrees.

Hubs 52, 56 are coupled to rotate with shaft 42 by bearing members 54, 58, respectively. Bearing members 54, 58 are configured to permit rotary member 44, including pulley cage 47, to move along shaft 42 relative to rotary member 46. As most clearly shown in FIGS. 3 and 4, bearing members 54, 58 are keyed to mate with one or more radial slots or ribs that longitudinally extend along shaft 42, such that pulley cage 47 may slide along shaft 42 over a predetermined range, while still turning pulley cage 47 about axis R in response to rotation of shaft 42.

Unlike pulley cage 47, rotary member 46 is preferably fixed at a predetermined position along shaft 42 between hub 52 and hub 56. Accordingly, rotary member 46 also turns in response to rotation of shaft 42. Rotary member 46 includes disk 60, preferably of a generally circular shape that has a center generally coincident with axis R. Disk 60 has a diameter at least as large as hub 52. As best seen in FIGS. 3 and 4, disk 60 defines a number of slots 66 that generally radially extend about shaft 42 from axis R at approximately 45 degree intervals as described in connection with bars 48. It should be appreciated that slots 66 are sized and arranged to each receive a corresponding one of bars 48 therethrough.

Rotary member 46 also includes a number of carriers 80 moveably coupled to disk 60. Carriers 80 each correspond to one of slots 66 and one of bars 48. Each carrier 80 is arranged to move along its corresponding slot 66 and travel relative to its corresponding bar 48 as will be more fully described hereinafter. Carriers 80 each have housing 81 defining band guide slot 84. It should be understood that one carrier 80 has been cutaway in the view of FIG. 2 so as not to obscure the side view of the topmost carrier 80. Carriers 80 carry generally circular contact band 61 that has an outer engagement surface 64 defining an outer perimeter for engagement by loop 100. Preferably, band 61 is defined by, at least a portion of spiral-coiled spring 62. For the configuration depicted in FIGS. 2–4, band 61 defines diameter D1 of pulley 40.

Referring specifically to FIG. 3, an end view of pulley 40 along view line 3—3 of FIG. 2 is depicted. In this view, the preferred circular shape of hub 56 and disk 60 are best illustrated. Further, keying of shaft 42 relative to bearing member 48 is also illustrated. In FIG. 3, part of the path of belt 100 obscured by disk 60 is illustrated in phantom. Obscured portions of bars 48, slots 66, and carriers 80 are also shown in phantom.

Referring specifically to FIG. 4, a partial sectional view taken along section line 4—4 of FIG. 2 is depicted. In this sectional view, only a portion of disk 60 is shown. Furthermore, additional details regarding spiral-coiled spring 62 are illustrated. Spiral-coiled spring has first end portion 68 that defines part of contact band 61. End portion 68 is fixedly anchored to one of carriers 80 at anchor point 70 using standard techniques. From anchor point 70, spiral-coiled spring 62 extends from one carrier to the next through corresponding guide slots 84 until again reaching anchor point 70. Once anchor point 70 is again reached, spiral-coiled spring 62 follows a path that passes underneath end portion 68 and coils about shaft 42 in chamber 50 defined by pulley cage 47. In FIG. 4, spiral-coiled spring 62 terminates at end portion 72 in chamber 50.

Figure 5:
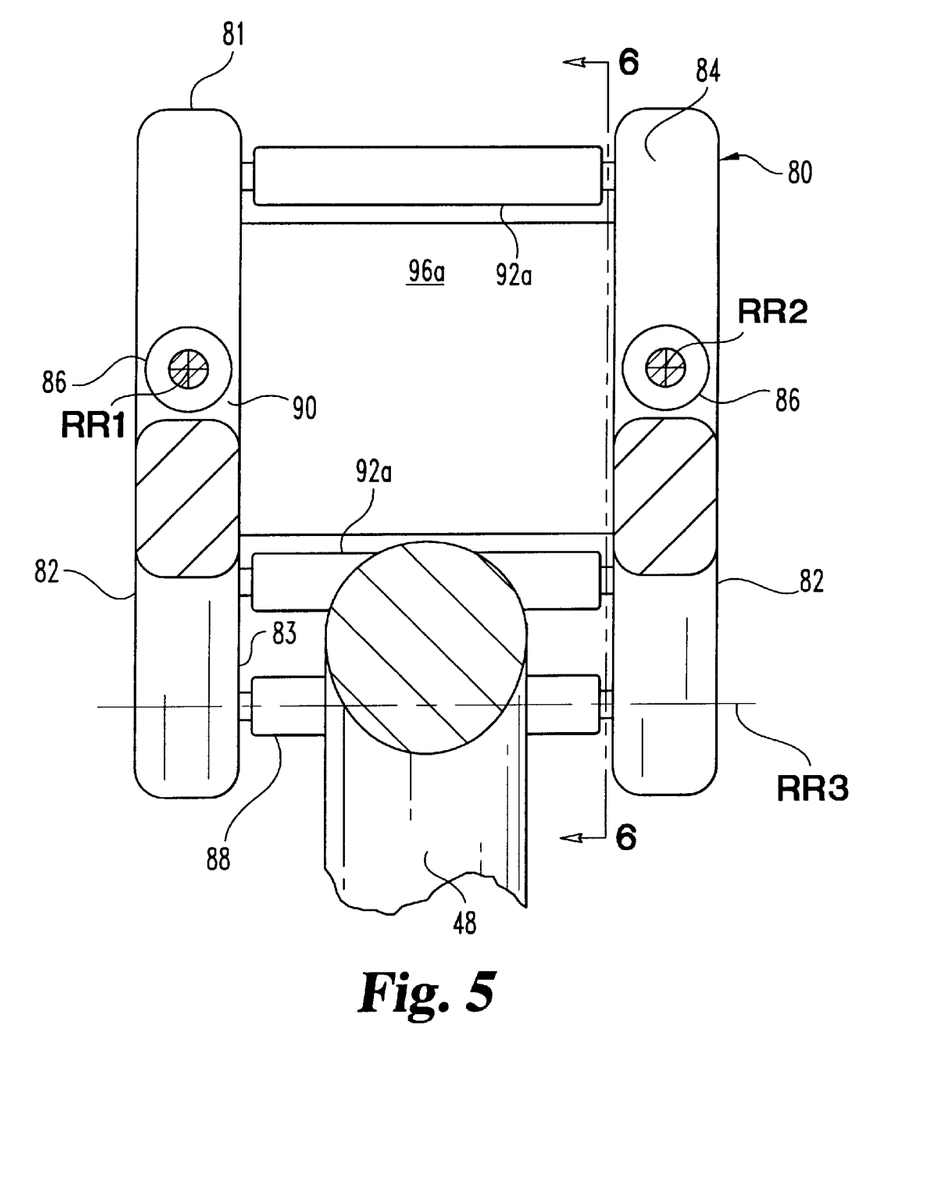
FIG. 5 is an enlarged, end view of one of the carriers shown in FIG. 4.
Figure 6:
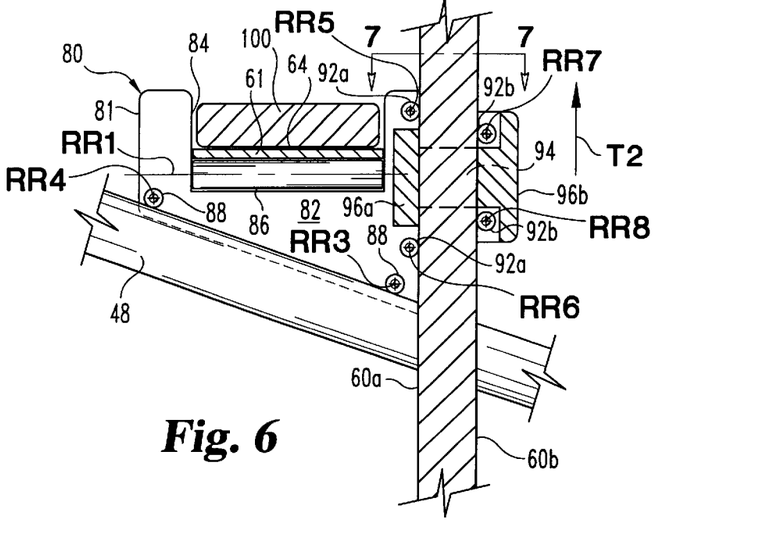
FIG. 6 is a partial, sectional side view of the carrier taken along section line 6—6 of FIG. 5.
Figure 7:
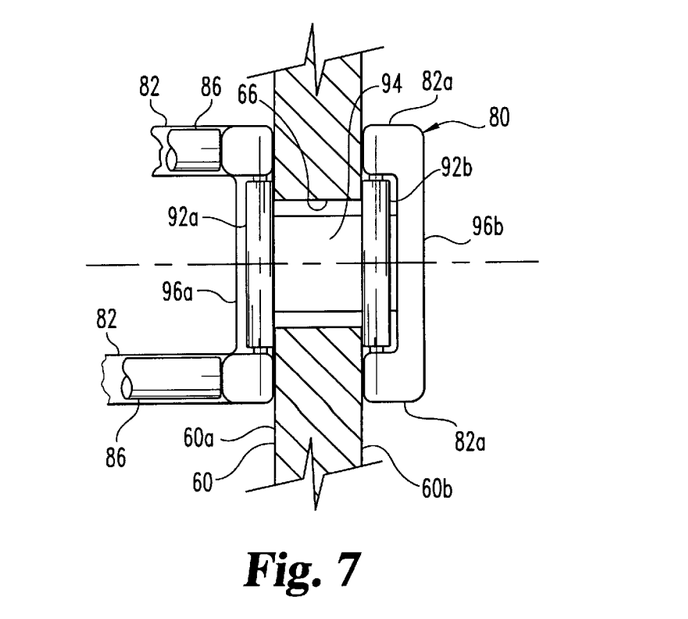
FIG. 7 is a partial, sectional top view of the carrier taken along section line 7—7 of FIG. 6.

FIG. 4 also presents a partial sectional view of each carrier 80. Turning to FIG. 5, an enlarged view of a representative one of the carriers 80 is provided in the form presented in FIG. 4; however, loop 100 and spiral-coiled spring 62 are not shown to enhance clarity of certain details. Housing 81 of carrier 80 includes a pair of opposing sidewalls 82 that define a channel 83 for receiving the corresponding bar 48 of cage 47. In FIG. 6, a partial, sectional side view of carrier 80 corresponding to section line 6--6 of FIG. 5 is illustrated with one of sidewalls 82 cut away. In FIG. 6, loop 100 and band 61, as defined by spiral-coiled spring 62, are shown in section. In FIG. 7, a partial, sectional top view of carrier 80 corresponding to section line 7—7 of FIG. 6 is shown.

Thus, referring to FIGS. 5–7, carrier 80 engages bar 48 in channel 83 with two roller bearings 88 positioned between sidewalls 82. Roller bearings 88 are arranged so that carrier 80 may travel relative to the corresponding bar 48 in contact with roller bearings 88. Roller bearings 88 are journaled to sidewalls 82 using standard techniques and rotate about axes RR3 and RR4, respectively. Carrier 80 also includes a pair of band roller bearings 86. Band roller bearings 86 are each journaled to a corresponding one of sidewalls 82 to each form a lower margin portion of guide slot 84. Band roller bearings 86 increase the ease with which spiral-coiled spring 62 may move through slots 84 to change the diameter of pulley 40 as more fully described hereinafter. Band roller bearings 86 rotate about axes RR1 and RR2, respectively. Carrier 80 further includes two roller bearings 92a to engage disk surface 60a of disk 60. Disk surface 60a faces hub 52. Roller bearings 92a are journaled to sidewalls 82 using standard techniques, and are arranged to rotate about axes RR5 and RR6, respectively. Opposite disk surface 60a is disk surface 60b that faces hub 56. Carrier 80 includes sidewalls 82a on the opposite side of disk 60 from sidewalls 82. Further, carrier 80 includes two roller bearings 92b to engage surface 60b. Roller bearings 92b are journaled to sidewalls 82a using standard techniques, and are arranged to rotate about axes RR7 and RR8, respectively.

Carrier 80 has cross members 96a and 96b on opposite sides of disk 60. Sidewalls 82 are connected by cross member 96a, and sidewalls 82a are connected by cross member 96b. An intermediate portion 94 of carrier 80 passes through the corresponding slot 66 of disk 60 and connects cross members 96a, 96b. Portion 94 is sized to freely pass through slot 66 without engaging the surrounding margins of disk 60. Correspondingly, roller bearings 92a, 92b are configured to be wider than slot 66 to permit engagement with surfaces 60a, 60b.

Figure 8:
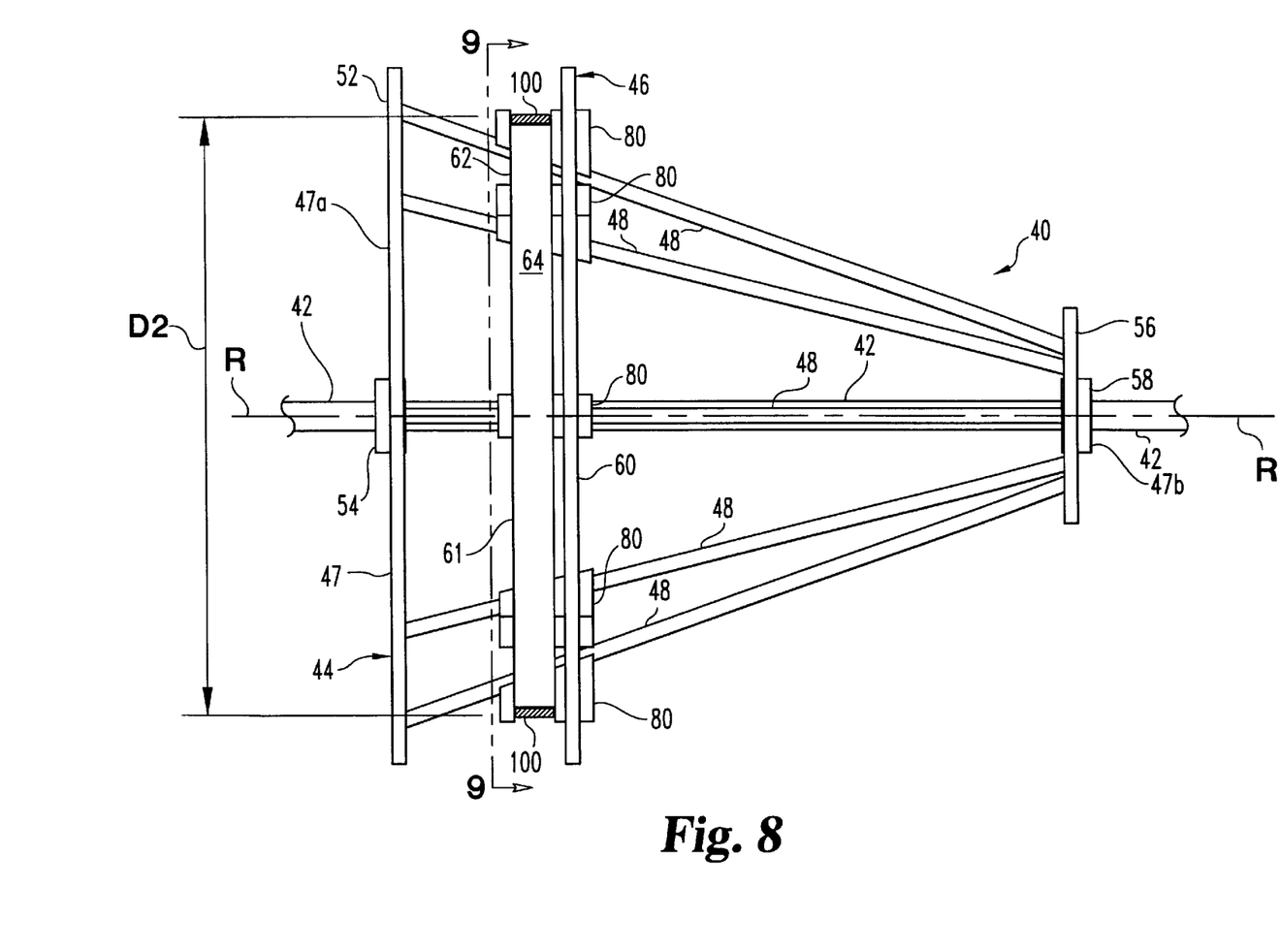
FIG. 8 is a side, elevational view of the pulley of FIG. 2 configured to provide a second pulley diameter larger than the first pulley diameter shown in FIGS. 2–4.
Figure 9:
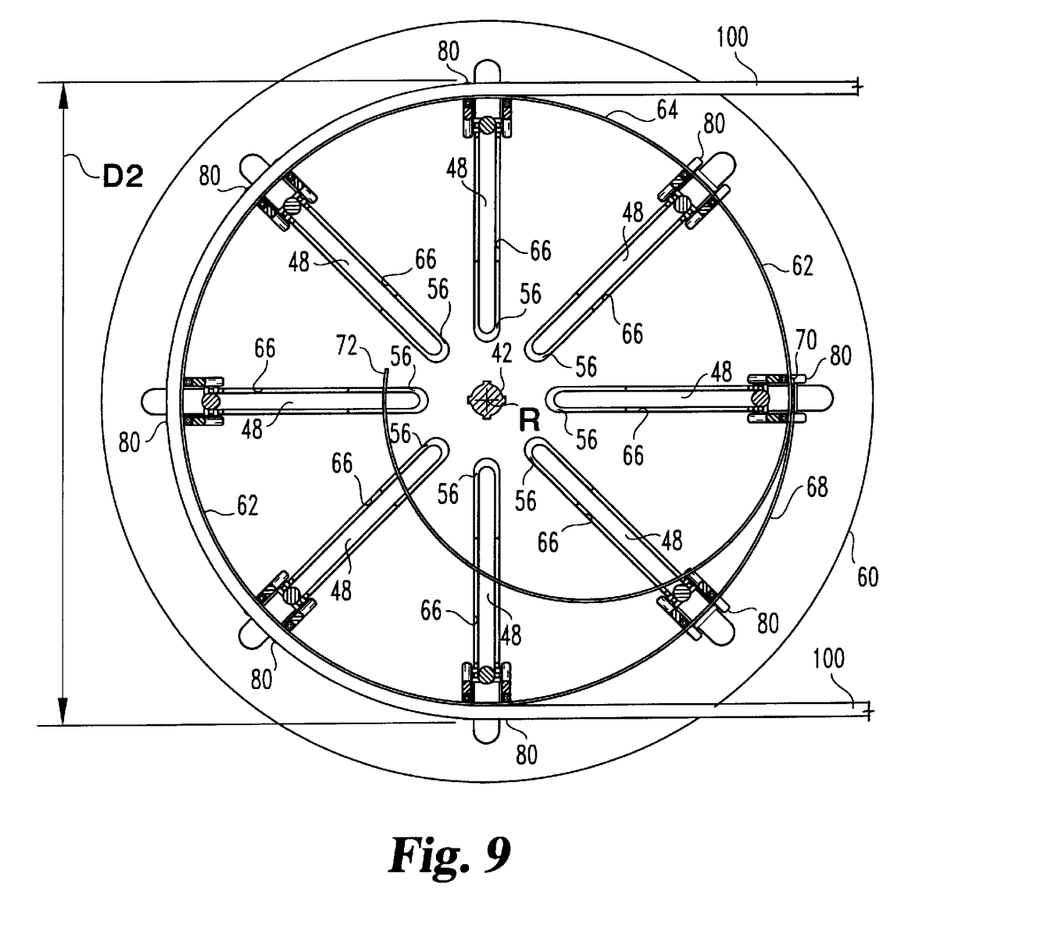
FIG. 9 is a partial, sectional view of the pulley taken along section line 9—9 of FIG. 8.

In FIGS. 8 and 9, pulley 40 is in a different configuration that provides a second diameter D2 greater than the diameter D1 shown for the configuration of FIGS. 2–4. Diameters D1, D2 each may be selected from a generally continuous, predetermined range of diameters of pulley 40 for making contact with loop 100. It should be appreciated that the relative position of rotary member 44 relative to rotary member 46 has changed in FIGS. 8 and 9 relative to FIGS. 2–4. This change in relative position may be provided by moving pulley cage 47 along axis R such that hub 52 and disk 60 approach one another, while disk 60 remains between hubs 52 and 56. Such movement may be provided by an actuation subsystem as described earlier in connection with control 30 of FIG. 1; however this standard actuation system is not shown in FIGS. 2–9 to preserve clarity.

Referring generally to FIGS. 2–9, the operability of pulley 40 is further described. Starting from the configuration shown in FIGS. 2–4, diameter D1 of pulley 40 is defined by a portion of spiral-coiled spring 62 about bars 48 that provides band 61. By moving pulley cage 47 along shaft 42 relative to disk 60, in the direction indicated by the arrow T1, hub 52 of pulley cage 47 approaches disk 60. Correspondingly, bars 48 move through slots 66 of disk 60. In response, roller bearings 88 of each carrier 80 rotate in relation to the respective moving bar 48, and carriers 80 are each urged in an outward radial direction away from shaft 42 along its corresponding slot 66. This direction of travel along slots 66 is indicated by the arrow T2 in FIG. 6. Accordingly, roller bearings 92a, 92b of carriers 80 in contact with surfaces 60a, 60b of disk 60, respectively, rotate and carriers 80 advance away from shaft 42.

At the same time, with the rotation of roller bearings 88 on bars 48, carriers 80 advance towards hub 52. Collectively, this movement of carriers 80 urges spiral-coiled spring 62 to unwind from the more coiled position shown in FIG. 4 to the less coiled positioned shown in FIG. 9. As a result, the diameter of pulley 40 increases from diameter D1 to diameter D2 and correspondingly the outer perimeter defined by band 61 increases. As spiral-coiled spring 62 uncoils in this manner, at least a portion residing in chamber 50 is withdrawn therefrom to define a part of the engagement surface 64 of band 61. Correspondingly, spring 62 revolves about shaft 42 fewer times for the position along pulley cage 47 shown in FIG. 9 relative to the number of revolutions of spring 62 about shaft 42 for the position along pulley cage 47 shown in FIG. 4.

If it is desired to return to a smaller diameter, such as diameter D1, from the larger diameter D2, then pulley cage 47 is moved in the direction opposite that indicated by arrow T1 along shaft 42. As a result, bars 48 move through slots 66 of disk 60 in the opposite direction as well, and carriers 80 move along slots 66 towards one another and shaft 42. Also, carriers 80 move closer to hub 56. As carriers 80 move in this manner, the spring bias of spiral-coiled spring 62 urges it to rewind in the coiled pattern about shaft 42 in chamber 50 as shown in FIG. 4. Accordingly, it should be appreciated that a continuous, predetermined range of different pulley 40 diameters are defined by positioning rotary members 44 and 46 relative to one another.

Preferably, the components of pulley 40 are formed from a material of suitable strength and character for operation as part of a durable transmission. In one embodiment, these components are formed from a metallic material, a composite, or a combination of both. Preferably, spiral-coiled spring 62 is formed from a flat spring steel ribbon that is biased to yieldingly recoil to the appropriate degree necessary for establishing the smallest desired diameter of pulley 40.

In other embodiments, a different number or arrangement of bars 48 is envisioned. By way of nonlimiting example, bars 48 may differ in number, may not be evenly spaced, and may be shaped in a helical pattern or compound angled pattern about shaft 42. Further, bars 48 may have a different cross-sectional shape along axis R. For example, bars 48 may have a rectangular, triangular, or elliptical cross-section to name only a few; and carriers 80 may be adapted using techniques known to those skilled in the art to operate with such various differently shaped bar 48 cross-sections. Likewise, shaft 42, hub 52, hub 56, bearing member 54, bearing member 58, and/or disk 60 may be variously shaped as would occur to those skilled in the art. In still other embodiments, the carriers may not number as many as the number of bars utilized. Indeed, in one embodiment, carriers are not used at all, instead allowing the spiral-coiled spring 62 to ride directly on bars 48. In a further embodiment, pulley cage 47 is fixed in relation to shaft 42, and disk 60 moves relative thereto. Alternatively, both rotary members 44, 46 may be moveable along shaft 42.

In one alternative embodiment, shaft 42 has a generally square cross-section and bearing members 54, 58 include roller bearings arranged in a square pattern to engage the sides of this square-shaped shaft 42. Further, each of eight bars 48 have a triangular cross-section along axis R. The triangularly shaped bars 48 are disposed such that a radius originating from axis R intersects an apex of the triangular section that is inwardly directed towards shaft 42 and bisects an opposing outer side of the triangular section. This outer side of each bar 48 presents a generally flat surface for a roller bearing of carrier 80 to engage.

Additionally or alternatively, carrier 80 may be arranged to pivot about a selected point so that it may adjust to changes in the angle of inclination or slope of its respective bar 48 relative to axis R. Referring back to FIG. 6, certain modifications of carrier 80 to provide such features are next described. For example, carrier 80 may be modified to alternatively be comprised of two articulated carriages coupled by a pivot pin. This pin has a pivot axis generally perpendicular to the view plane of FIG. 6. One of the articulated carriages includes rollers 86 and 88, and the other of the carriages includes rollers 92a, 92b. For this embodiment, sidewalls 82 are each separated into two pieces along a break line between rollers 86, 88 and rollers 92a, 92b. Also, the separated sidewall 82 pieces are modified to facilitate pivotal coupling of the first carriage, including parts of sidewalls 82 and rollers 86, 88, to the second carriage, including the remaining parts of sidewalls 82, sidewalls 82a, and rollers 92a, 92b.

In a different embodiment, the acuation system/power source is attached to the shaft 42 inside pulley cage 47 with all other components rotating freely.

Still another embodiment of the present invention includes a rotary power source and a continuously variable transmission coupled to the power source. This transmission includes a first shaft, a first pulley coupled to rotate with the first shaft, a second shaft, a second pulley coupled to rotate with the second shaft, and an endless power transfer loop coupled about the first pulley and the second pulley. The first pulley is of a variable diameter type to adjust a turning ratio relative to the second pulley. The first pulley includes a pulley cage including a number of bars spaced apart from one another about the first shaft. The bars are each inclined relative to a rotational axis of the first shaft to define a generally frustoconical shape. The first pulley also includes a disk defining a number of slots each receiving a corresponding one of the bars of the pulley cage therethrough. The pulley cage and the disk are operable to selectively adjust relative position of one to the other. A number of carriers are each coupled to the disk that travel along a corresponding one of the slots and engage a corresponding one of the bars to travel therealong in response to a change in the relative position between the pulley cage and pulley disk. A band defines a surface in contact with the loop and is positioned about the bars on the carriers. This band travels with the carriers to correspondingly change an effective diameter of the first pulley.

In a further embodiment, a rotary power source and transmission are coupled together. The transmission includes a first shaft, a first pulley coupled to rotate with the first shaft, a second shaft, a second pulley coupled to rotate with the second shaft, and an endless power transfer loop coupled about the first pulley and the second pulley. The first pulley includes a first rotary member defining a number of slots radially spaced about the shaft and a second rotary member. This second member includes a number of bars radially spaced about the first shaft that each become progressively closer to the shaft relative to a direction of travel therealong. The bars each extend through a corresponding one of the slots of the first member. The first and second members are selectively adjustable to vary position of one relative to the other. A spiral-coiled spring is positioned about the bars to define a surface in contact with the loop. This spring is operable to rotate with the first and second members and vary an effective diameter of the first pulley in response to a change in the relative position. The spiral-coiled spring has a first end coupled to the first member to be carried therewith.

Another alternative embodiment includes a rotary power source and a transmission coupled to the rotary power source. This transmission includes a first shaft, a first pulley to rotate with the first shaft, a second shaft, a second pulley coupled to rotate with the second shaft, and an endless power transfer loop coupled about the first pulley and the second pulley. The first pulley includes a first member defining a number of slots radially spaced about the first shaft and a second member. This second member includes a number of bars radially spaced about the first shaft that each become progressively closer to the first shaft relative to a direction of travel along the rotational axis. These bars each extend through a corresponding one of the slots of the first member. The second member defines a chamber between the bars and the first shaft. Also included is a band positioned about the bars to define a surface in contact with the loop. This band is coupled to the first member to be carried therewith. The first member, second member, and band rotate together when the first shaft is rotated. The first member and the second member are operable to change relative position of one to another to correspondingly change location of the band along the second member. The band has a first perimeter about the bars at a first location along the second member, and a second perimeter about the bars at a second location along the second member. The second perimeter is greater than the first perimeter. A first portion of the band resides in the chamber of the second member while the band is at the first location. This first portion defines a corresponding segment of the second perimeter while the band is at the second location.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions as defined by the claims that follow are desired to be protected.

What is claimed is:

1. An apparatus, comprising: a rotary power source and a continuously variable transmission coupled to said rotary power source, said continuously variable transmission including a first shaft, a first pulley coupled to rotate with said first shaft, a second shaft, a second pulley coupled to rotate with said second shaft, and an endless power transfer loop coupled about said first pulley and said second pulley, said first pulley being of a variable diameter type to adjust turning ratio relative to said second pulley, said first pulley including:

a pulley cage including a number of bars radially spaced apart from one another about said first shaft, said bars each being inclined relative to a rotational axis of said first shaft to define a generally frustoconical shape;

a pulley disk defining a number of slots each receiving a corresponding one of said bars therethrough, said pulley cage and said pulley disk being operable to selectively adjust a relative position of one to another;

a number of carriers each coupled to said pulley disk to travel along a corresponding one of said slots and each engaging a corresponding one of said bars to travel therealong in response to a change in said relative position; and a band defining a surface in contact with said loop, said band being positioned about said bars on said carriers, said band travelling with said carriers to correspondingly change an effective diameter of said first pulley.

2. The apparatus of claim 1, wherein said band includes a spiral-coiled spring.

3. The apparatus of claim 1, wherein said carriers each include at least one roller in contact with said corresponding one of said bars.

4. The apparatus of claim 1, wherein said bars each have a first end portion opposing a second end portion, said cage includes a first hub coupled to said first end portion of each of said bars and a second hub coupled to said second end portion of each of said bars.

5. The apparatus of claim 4, wherein said pulley disk is positioned between said first hub and said second hub.

6. The apparatus of claim 5, wherein said bars are inclined relative to said rotational axis at an angle between about 5 and about 80 degrees.

7. The apparatus of claim 6, wherein said loop includes a belt and said second pulley is of said variable diameter type.

8. An apparatus, comprising: a rotary power source and a transmission coupled to said rotary power source, said transmission including a first shaft, a first pulley coupled to rotate with said first shaft, a second shaft, a second pulley coupled to rotate with said second shaft, and an endless power transfer loop coupled about said first pulley and said second pulley, said first pulley including:

a first rotary member defining a number of slots radially spaced about said first shaft;

a second rotary member including a number of bars radially spaced about said first shaft, said bars each becoming progressively closer to said shaft relative to a direction of travel along said shaft, said bars each extending through a corresponding one of said slots of said first rotary member, said first rotary second rotary members being selectively adjustable to vary relative position of one to another; and a spiral-coiled spring positioned about said bars to define a surface in contact with said loop, said spiral-coiled spring being operable to rotate with said first and second rotary members and vary an effective diameter of said first pulley in response to a change in said relative position, and said spiral-coiled spring having a first end portion coupled to said first rotary member to be carried therewith.

9. The apparatus of claim 8, wherein said loop is in the form of a belt and said second pulley is of a variable diameter type.

10. The apparatus of claim 8, wherein said second rotary member defines a chamber between said bars and said first shaft, said spring has a second end portion, said second end portion is positioned in said chamber for a first position of said spring along said second rotary member corresponding to a first diameter, and at least part of said second end portion defines a perimeter of said spring about said bars for a second position of said spring along said second rotary member corresponding to a second diameter, said second diameter being greater than said first diameter.

11. The apparatus of claim 10, wherein said spring makes more revolutions about said first shaft for said first position than said second position.

12. The apparatus of claim 8, wherein said bars each have a first end portion opposing a second end portion, said second rotary member includes a first hub coupled to said first end portion of each of said bars and a second hub coupled to said second end portion of each of said bars, and said first rotary member is positioned between said first hub and said second hub along said first shaft.

13. The apparatus of claim 8, wherein said bars are each inclined at an angle relative to a rotational axis of said first shaft, said angle being between about 5 and about 80 degrees.

14. The apparatus of claim 8, further comprising a number of carriers carried by said first rotary member, said carriers each corresponding to one of said slots and one of said bars.

15. An apparatus, comprising: a rotary power source and a transmission coupled to said rotary power source, said transmission including a first shaft, a first pulley coupled to rotate with said first shaft, a second shaft, a second pulley coupled to rotate with said second shaft, and an endless power transfer loop coupled about said first pulley and said second pulley, said first pulley including:

a first member defining a number of slots radially spaced about said first shaft;

a second member including a number of bars radially spaced about said first shaft, said bars each becoming progressively closer to said first shaft relative to a direction of travel along said rotational axis, said bars each extending through a corresponding one of said slots of said first member, said second member defining a chamber between said bars and said first shaft;

a band positioned about said bars to define a surface in contact with said loop, said band being coupled to said first member to be carried therewith; and wherein said first member, said second member, and said band rotate together with said first shaft, said first member and said second member are operable to change relative position of one to another to correspondingly change location of said band along said second member, said band has a first perimeter about said bars at a first location along said second member and a second perimeter about said bars at a second location along said second member, said second perimeter being greater than said first perimeter, a first portion of said band resides in said chamber of said second member while said band is at said first location, and said first portion defines a corresponding segment of said second perimeter while said band is at said second location.

16. The apparatus of claim 15, wherein said band is defined by a spiral-coiled spring.

17. The apparatus of claim 16, wherein said spring revolves about said first shaft more times when at said first location than at said second location.

18. The apparatus of claim 15, wherein said second pulley is of a variable diameter type.

19. The apparatus of claim 15, wherein said bars each have a first end portion opposing a second end portion, said second member includes a first hub coupled to said first end portion of each of said bars and a second hub coupled to said second end portion of each of said bars, and said first member is positioned between said first hub and said second hub along said first shaft.

20. The apparatus of claim 19, wherein said first member includes a number of carriers each corresponding to one of said slots and one of said bars, said loop includes a belt, said band includes a spiral-coiled spring having a first end portion coupled to said first member and a second end portion extending into said chamber when said band is at said first position, and said spring revolves about said first shaft more times when said band is at said first location than when said band is at said second location.

* * * * *